J. Fitch,
Water Filter.
Nº 23,297. Patented Mar. 22, 1859.
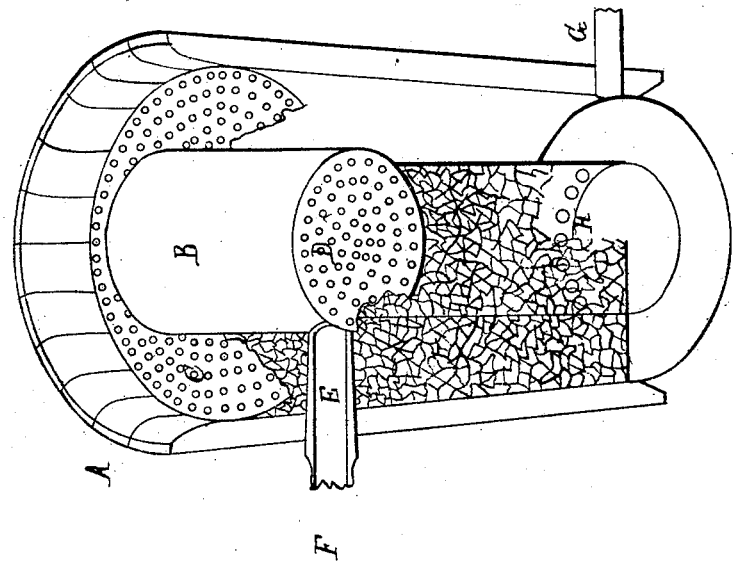
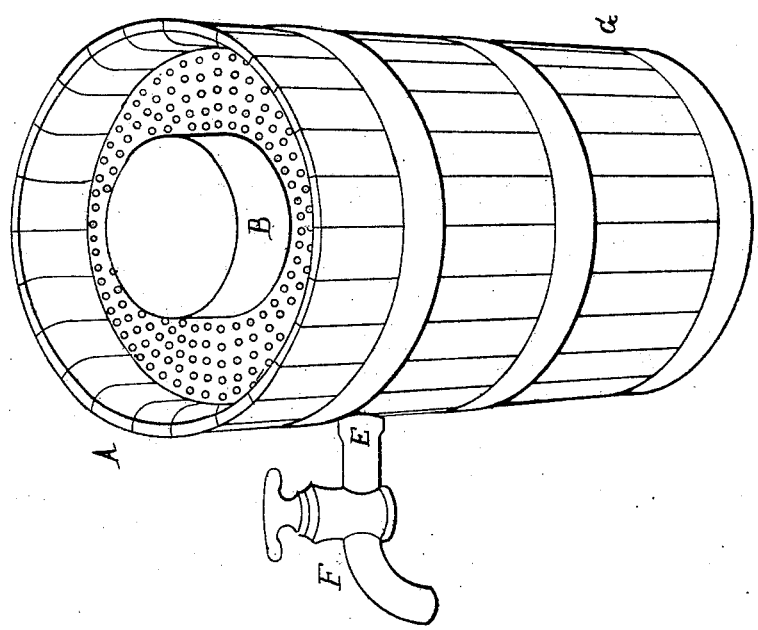

UNITED STATES PATENT OFFICE.

JOHN FITCH, OF SENECA FALLS, NEW YORK.

FILTER.

Specification of Letters Patent No. 23,297, dated March 22, 1859.

*To all whom it may concern:*

Be it known that I, JOHN FITCH, of Seneca Falls, in the county of Seneca and State of New York, have invented a new and useful Improvement in Filters for Filtering Liquids; and I do hereby declare that the following is a full and exact description thereof, reference being had to the accompanying drawings and the letters of reference marked thereon.

The nature of my invention consists in so constructing and combining the different parts of a filter as to obtain greater surface of action with a ready means of cooling the fluid filtered and a convenient and easy mode of cleansing the filter and other advantages hereinafter mentioned over the filters heretofore used.

Figure 1 is a perspective view. Fig. 2 is a vertical section of my improved filter, the same letters being used to designate the same parts in each figure referred to.

A is the outside case or tub constructed in the usual manner which may be of the form and size of a barrel made of straight staves larger at the top than at the bottom, being open at the top.

B is a cylinder or crock of stone ware or other suitable material reaching from the level of the top of the outside case to the bottom thereof on which it rests, this cylinder has near the bottom thereof a row of perforations through its sides (as represented at H Fig. 2) to afford communication between the interior of said cylinder and the space between it and the outside case A. The cylinder B is at its upper portion one half of the diameter of the outside case and at a point midway between the top and bottom thereof its diameter is made from one to two inches less which diminished diameter continues to the bottom thereof. This forms a shoulder or jog within the cylinder B on which rests the perforated plate D. The perforated plate C rests on the sides of the outside case and is about six inches below the top of said case having a circular opening in its center sufficient to admit the cylinder B through it. These perforated plates C and D may be of stone ware or other suitable material. A pipe E terminating in the faucet F passes from the inside of the cylinder B at a point just above the perforated plate D to the outside of the outer case. A faucet G near the bottom of the outside case passes through said case and serves to draw off any sediment which may collect at the bottom thereof.

The top of the filter may be covered or open as convenience requires.

The space between the cylinder B and the outside case A which is below the perforated plate C is filled with charcoal or other filtering material up to said plate. The lower part of the cylinder B is also filled with charcoal or other filtering material up to the perforated plate D.

To use this improved filter the water or fluid to be filtered is let on to the perforated plate C and descending to the bottom of the filter passes through the perforations near the bottom in the cylinder B and rising through the filtering material contained in the lower part thereof is drawn from above the perforated plate D through the pipe E and faucet F in a purified state.

For the purpose of cooling the fluid filtered whenever desired the upper portion of the cylinder B is partly filled with ice.

I sometimes let the fluid to be filtered on to the perforated plate D from which it descends through the cylinder and rises between the cylinder and outside case taking the purified fluid off from the top of the perforated plate C dispensing with the use of the faucet F which is in this case kept closed.

I do not claim the ordinary cask or tub filters with pot or reservoir filled with charcoal or other filtering material the same having been known and used.

What I claim as my invention and desire to secure by Letters Patent is—

The combination of the cylinder B constructed and partly filled as described with the outside case A having the perforated plates and the filtering material disposed and arranged as described by means of which the fluid to be filtered is made to pass through the filtering material for a greater distance and a more perfect purification effected. I also obtain by the same combination a convenient mode of cooling the fluid and also of cleansing the filter without deranging its parts by means of reversing its action in the manner described, the whole constructed and operating in the manner and for the purposes above mentioned.

JOHN FITCH.

Witnesses:
BENSON OWEN,
COURTLAND VANKESSELERER.